(12) United States Patent
Shimada et al.

(10) Patent No.: US 8,971,636 B2
(45) Date of Patent: Mar. 3, 2015

(54) IMAGE CREATING DEVICE, IMAGE CREATING METHOD AND RECORDING MEDIUM

(71) Applicant: Casio Computer Co., Ltd., Shibuya-ku, Tokyo (JP)

(72) Inventors: Keisuke Shimada, Hamura (JP); Shigeru Kafuku, Akishima (JP); Hirokiyo Kasahara, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 82 days.

(21) Appl. No.: 13/923,253

(22) Filed: Jun. 20, 2013

(65) Prior Publication Data

US 2013/0343656 A1 Dec. 26, 2013

(30) Foreign Application Priority Data

Jun. 22, 2012 (JP) ................................. 2012-140288

(51) Int. Cl.
*G06K 9/66* (2006.01)
*G06K 9/00* (2006.01)

(52) U.S. Cl.
CPC .................................. *G06K 9/00268* (2013.01)
USPC ........... 382/195; 382/118; 382/203; 382/218; 382/219; 382/220; 382/221; 382/222

(58) Field of Classification Search
CPC .................................................. G06K 9/00268
USPC ......... 382/195, 118, 203, 218, 219, 220, 221, 382/222
See application file for complete search history.

(56) References Cited

U.S. PATENT DOCUMENTS

| 2007/0189584 | A1* | 8/2007 | Li ................................. | 382/118 |
| 2008/0062198 | A1* | 3/2008 | Takahashi et al. ............ | 345/630 |
| 2010/0164987 | A1 | 7/2010 | Takahashi et al. | |
| 2011/0091071 | A1* | 4/2011 | Sabe et al. .................... | 382/103 |

FOREIGN PATENT DOCUMENTS

JP 2004-145625 A 5/2004
JP 2008-061896 A 3/2008

* cited by examiner

*Primary Examiner* — Mike Rahmjoo
(74) *Attorney, Agent, or Firm* — Holtz, Holtz, Goodman & Chick PC

(57) ABSTRACT

Disclosed is an image creating device including a first obtaining unit which obtains an image including a face, a first extraction unit which extracts a face component image relating to main components of the face in the image and a direction of the face, a second obtaining unit which obtains a face contour image associated to the face in the image and a second extraction unit which extracts a direction of a face contour in the face contour image. The image creating device further includes a converting unit which converts at least one of the face component image and the face contour image based on the both directions of the face and the face contour and a creating unit which creates a portrait image by using at least one of the face component image and the face contour image being converted by the converting unit.

9 Claims, 9 Drawing Sheets

IMAGE CREATING DEVICE, IMAGE CREATING METHOD AND RECORDING MEDIUM

BACKGROUND OF THE INVENTION

1. Field of the Invention

The present invention relates to an image creating device, an image creating method and a recording medium.

2. Description of the Related Art

Conventionally, there has been known a portrait creation device that creates a portrait by using feature points of face parts such as eyes, a nose, a mouth, ears, and a facial contour (see JP 2004-145625).

Moreover, there has been known a game device in which characters are created by combining part objects with one another. The part objects are prepared for each of regions in advance (see JP 2008-061896).

In the above conventional techniques, because the face image which is input is not always facing the front direction, there has been a problem that the balance between the components and the face contour image becomes unbalanced and an unnatural portrait will be created when creating a portrait by placing the main components of the face such as eyes, nose, mouth and the like, which are not facing the front direction, in a prepared face contour image which is facing the front direction.

SUMMARY OF THE INVENTION

It is, therefore, an object of the present invention is to provide an image creating device, an image creating method and a recording medium by which a natural portrait can be created by converting components or a face contour image.

According to an embodiment of the present invention, there is provided an image creating device including a first obtaining unit which obtains an image including a face, a first extraction unit which extracts a face component image relating to main components of the face in the image obtained by the first obtaining unit and a direction of the face, a second obtaining unit which obtains a face contour image associated to the face in the image obtained by the first obtaining unit, a second extraction unit which extracts a direction of a face contour in the face contour image obtained by the second obtaining unit, a converting unit which converts at least one of the face component image and the face contour image based on the both directions of the face and the face contour, and a creating unit which creates a portrait image by using at least one of the face component image and the face contour image being converted by the converting unit.

According to an embodiment of the present invention, there is provided an image creating method including first obtaining an image including a face, first extracting a face component image and a direction of the face relating to main components of a face in the image obtained in the first obtaining, second obtaining a face contour image associated to feature information of the face in the image obtained in the first obtaining, second extracting a direction of a face contour in the face contour image obtaining in the second obtaining, converting at least one of the face component image or the face contour image based on the directions of the face and the face contour, and creating a portrait image by using the face component image and the face contour image, at least one of the face component image and the face contour image being converted in the converting.

According to an embodiment of the present invention, there is provided a computer readable recording medium in which programs readable by a computer of an image creating device are recorded, the programs make the computer function as a first obtaining unit which obtains an image including a face, a first extraction unit which extracts a face component image relating to main components of the face in the image obtained by the first obtaining unit and a direction of the face, a second obtaining unit which obtains a face contour image associated to the face in the image obtained by the first obtaining unit, a second extraction unit which extracts a direction of a face contour in the face contour image obtained by the second obtaining unit, a converting unit which converts at least one of the face component image and the face contour image based on the both directions of the face and the face contour, and a creating unit which creates a portrait image by using at least one of the face component image and the face contour image being converted by the converting unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 8A and 83 are views schematically showing examples of portrait images created by the portrait image creation processing.

DESCRIPTION OF THE PREFERRED EMBODIMENTS

Figure 1:
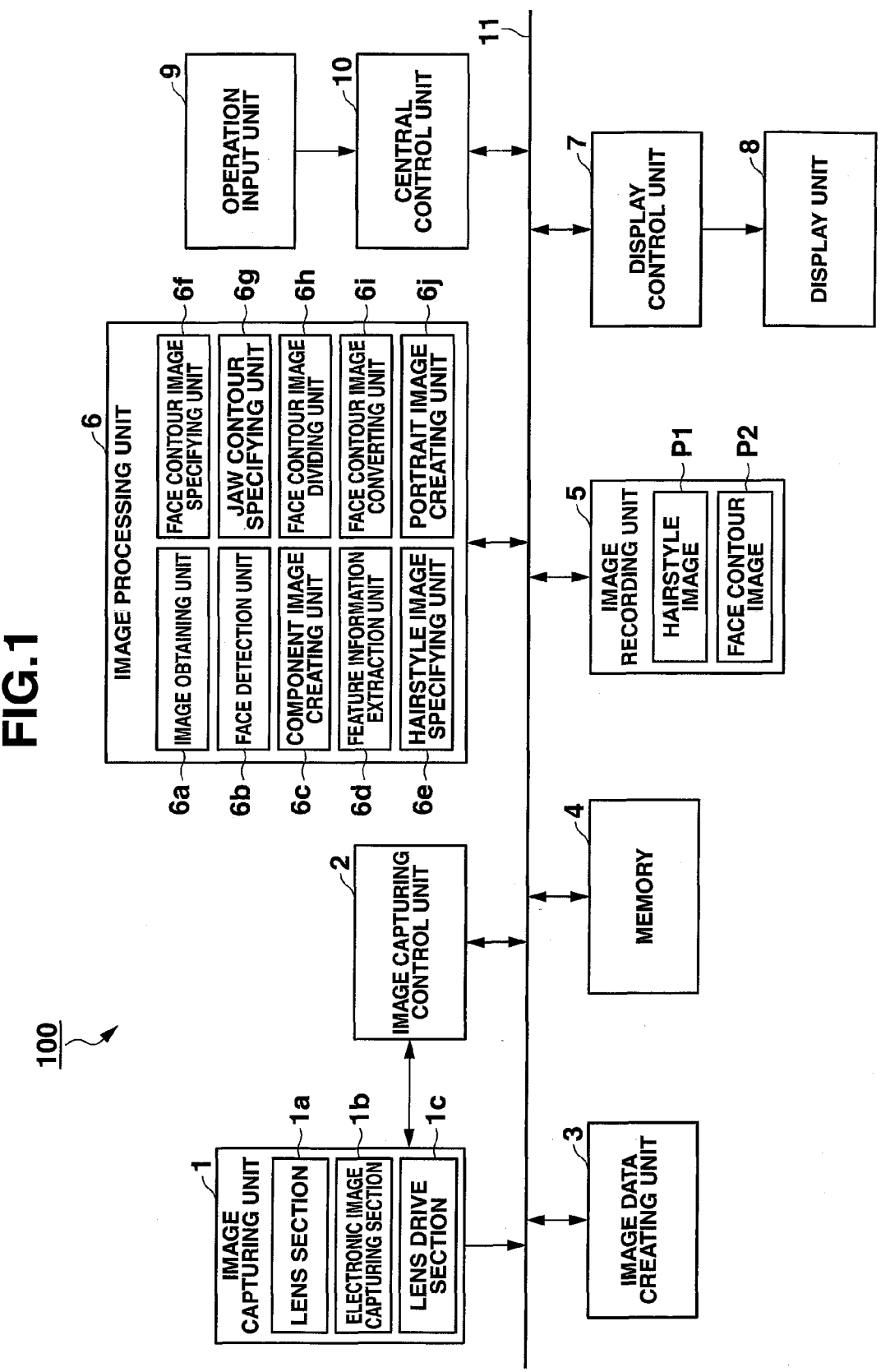
FIG. 1 is a block diagram showing a schematic configuration of an image capturing device of an embodiment to which the present invention is applied.

Hereinafter, specific embodiments of the present invention will be described with reference to the drawings. However, the scope of the present invention is not limited to the examples shown in the drawings.

(First Embodiment)

FIG. 1 is a block diagram showing a schematic configuration of an image capturing device 100 of the embodiment to which the present invention is applied.

As shown in FIG. 1, the image capturing device 100 of the embodiment specifically includes an image capturing unit 1, an image capturing control unit 2, an image data creating unit 3, a memory 4, an image recording unit 5, an image processing unit 6, a display control unit 7, a display unit 8, an operation input unit 9 and a central control unit 10.

Moreover, the image capturing unit 1, the image capturing control unit 2, the image data creating unit 3, the memory 4, the image recording unit 5, the image processing unit 6, the display control unit 7 and the central control unit 10 are connected to one another through a bus line 11.

The image capturing unit 1, as an image capturing device, captures images of a predetermined subject and creates frame images.

Specifically, the image capturing unit 1 includes a lens section 1a, an electronic image capturing section 1b and a lens drive section 1c.

The lens section 1a is composed, for example, of a plurality of lenses such as a zoom lens and a focus lens.

The electronic image capturing section 1b is composed, for example, of an imaging sensor such as a charge coupled device (CCD) and a complementary metal-oxide semiconductor (CMOS). The electronic image capturing section 1b converts an optical image, which has passed through a variety of the lenses of the lens section 1a, into a two-dimensional image signal.

The lens drive section 1c includes, for example, though not shown, a zoom drive unit that moves the zoom lens in an optical axis direction, a focusing drive unit that moves the focus lens in the optical axis direction, and the like.

Note that, in addition to the lens section 1a, the electronic image capturing section 1b and the lens drive section 1c, the image capturing unit 1 may include a diaphragm (not shown) that adjusts a quantity of light that passes through the lens section 1a.

The image capturing control unit 2 controls the image capturing of the subject performed by the image capturing unit 1. That is to say, though not shown, the image capturing control unit 2 includes a timing generator, a driver and the like. The image capturing control unit 2 scans and drives the electronic image capturing section 1b by the timing generator and the driver, and converts the optical image, which has passed through the lenses, into the two-dimensional image signal by the electronic image capturing section 1b in every predetermined cycle. Then, the image capturing control unit 2 reads out frame images one-by-one from an image capturing region of the electronic image capturing section 1b, and outputs the readout frame images to the image data creating unit 3.

Note that the image capturing control unit 2 may be configured to move the electronic image capturing section 1b in the optical axis direction in place of the focus lens of the lens section 1a, and may thereby adjust a focusing position of the lens section 1a.

Moreover, the image capturing control unit 2 may perform adjustment/control for image capturing conditions of the subject, such as automatic focusing processing (AF), automatic exposure processing (AE) and automatic white balance (AWB).

The image data creating unit 3 appropriately performs gain adjustment for analog-value signals of the frame images, which are transferred thereto from the electronic image capturing section 1b, for each of color components of R, G and B, thereafter, performs sample and hold for the signals concerned by a sample-and-hold circuit (not shown), and coverts the signals into digital data by an A/D converter (not shown). Then, the image data creating unit 3 performs color process treatment, which includes pixel interpolation processing and y-correction processing, for the digital data by a color processing circuit (not shown), and thereafter, creates digital-value luminance signals Y and color-difference signals Cb and Cr (YUV data).

The luminance signals Y and the color-difference signals Cb and Cr, which are outputted from the color processing circuit, are DMA-transferred through a DMA controller (not shown) to the memory 4 for use as a buffer memory.

The memory 4 is composed, for example, of a dynamic random access memory (DRAM) or the like, and temporarily stores data and the like, which are to be processed by the image processing unit 6, the central control unit 10, and the like.

The image recording unit 5 is composed, for example, of a non-volatile memory (flash memory) and the like, and records image data to be recorded, the image data being encoded in accordance with a predetermined compression format (for example, a JPEG format and the like) by an encoding unit (not shown) of the image processing unit 6.

Moreover, the image recording unit (recording unit) 5 records image data of a plurality of hairstyle images P1 (not shown) and face contour images P2 (not shown) corresponding to a plurality of face shapes which are illustrations to be used for creating a portrait image in advance.

The image data of the hairstyle images P1 includes images schematically expressing hairstyle contours of persons, for example, and the image data of the face contour images P2 includes images schematically expressing face contours of persons, for example.

Specifically, the image data of a hairstyle image P1 can be formed by deleting the jaw contour of a face and the parts inside the jaw from a face region detected by the face detection processing (described later). Further, a face contour image P2 can be formed by extracting only the face contour from the face region detected by the face detection processing (described later).

Moreover, image data of a hairstyle image P1 can be formed by coloring the hair with a predetermined color. Further, a face contour image P2 can be formed by coloring the skin part with a predetermined color.

Rendering of lines of face contour and tips of hair may be performed manually or on the basis of a predetermined operation of the operation input unit 9 by a user or may be performed automatically under control of the CPU of the central control unit 10.

The image recording unit 5 is configured so that a recording medium (omitted in the drawing) is detachable, for example, and may be configured to control reading out of data from the installed recording medium and writing of data on the recording medium.

The image processing unit 6 includes an image obtaining unit 6a, a face detection unit 6b, a component image creating unit 6c, a feature information extraction unit 6d, a hairstyle image specifying unit 6e, a face contour image specifying unit 6f, a jaw contour specifying unit 6g, a face contour image dividing unit 6h, a face contour image converting unit 6i and a portrait image creating unit 6j.

Here, although each part of the image processing unit 6 is configured with a predetermined logic circuit, this is merely an example of configuration and the present invention is not limited to such example.

The image obtaining unit 6a obtains an image which is subject to the portrait image creation processing.

Figure 2A:
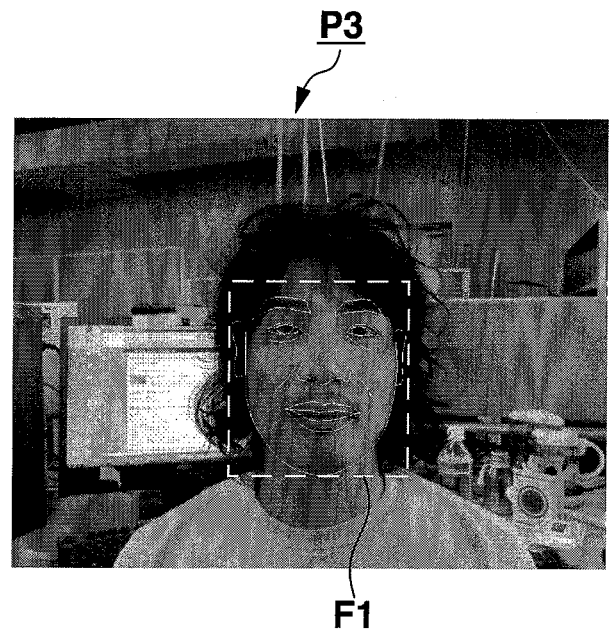
FIGS. 2A and 2B are views schematically showing examples of images relating to portrait image creation processing.

In other words, the image obtaining unit 6a, as the first obtaining unit, obtains image data of an original image (for example, photograph image or the like) P3. In particular, the image obtaining unit 6a obtains a copy of image data (YUV data) of an original image P3, which is created by the image data creating unit 3 by capturing an image of a subject with the image capturing unit 1 and the image capturing control unit 2, from the memory 4 or the image obtaining unit 6a obtains a copy of image data (YUV data) of an original image P3 recorded in the image recording unit 5 (see FIG. 2A).

The face detection unit 6b detects the face region F1 (see FIG. 2A) in the original image P3 which is subject for processing.

In other words, the face detection unit 6b, as a face detection unit, detects the face region F1 including the face in the original image P3 which is obtained by the image obtaining unit 6a. In particular, the face detection unit 6b obtains image data of the original image P3 which is obtained as an image subject to the portrait image creation processing by the image obtaining unit 6a and detects the face region F1 by performing predetermined face detection processing with respect to the image data.

Here, since face detection processing is a well known technique, detailed description will be omitted.

Figure 3A:
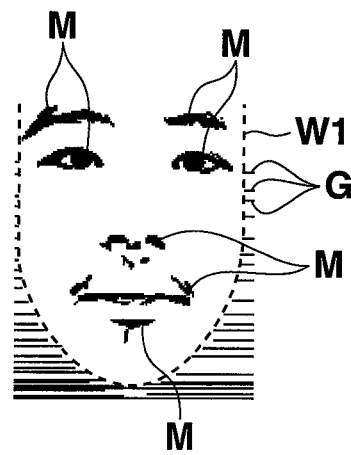
FIGS. 3A and 3B are views schematically showing examples of images relating to the portrait image creation processing.
Figure 3B:
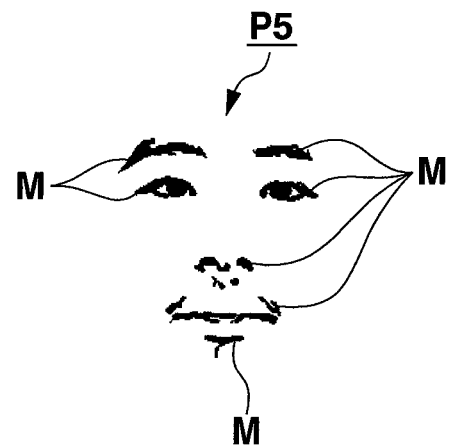

The component image creating unit 6c creates a face component image P5 expressing the main face components of the face (see FIG. 3B).

Figure 2B:
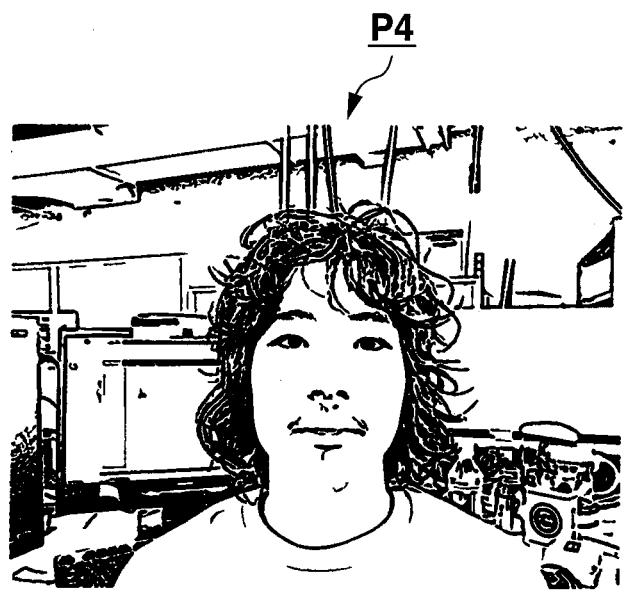

In other words, the component image creating unit 6c, as an extraction unit, extracts the face component image P5 of the main face components of the face in the original image P3 (see FIG. 2A) obtained by the image obtaining unit 6a. In particular, the component image creating unit 6c performs detail extraction processing with respect to the face region F1 including the face in the original image P3 and creates the face detail image P4 (see FIG. 2B) wherein face components such as eyes, nose, mouth, eye brows, hair, face contour and such like, for example, are expressed with lines. For example, the component image creating unit 6c creates the face detail image P4 by processing using AAM (Active Appearance Model) as the detail extraction processing. Further, the component image creating unit 6c performs the detail extraction processing with respect to the face region F1 detected in the image data of the original image P3 by the face detection unit 6b.

Moreover, the component image creating unit 6c, as the first detecting unit, detects the direction of the face in the original image P3 which is obtained by the image obtaining unit 6a. As for the processing for detecting the face direction, the description will be omitted here because it is a well known technique.

Here, AAM is a method for modeling a visual matter and is processing for modeling an image of an arbitrary face region F1. For example, the component image creating unit 6c registers positions of predetermined detail parts (for example, corners of eyes, tips of noses, face lines and the like) of a plurality of sample face images and statistical analysis results of pixel values (for example, brightness values) in a predetermined registration unit. Then, the component image creating unit 6c sets a texture model which expresses "Appearance" relating to a shape model of a face shape and an average shape by setting the positions of the feature parts and performs modeling of the image of the face region F1 using this model. In such way, the component image creating unit 6c extracts the main components in the original image P3 and creates the face detail image P4 expressed with lines.

Further, the component image creating unit 6c specifies the contour W1 (see FIG. 3A) of the face in the face region F1 by the detail extraction processing and creates the face component image P5 wherein the face components within the contour W1 of the face and the face components that contact the contour W1 are expressed with lines.

In particular, the component image creating unit 6c specifies the pixels in the face detail image P4 that contact the contour W1 of the face and deletes the pixel groups G ... (see FIG. 3A) among the specified pixels and the continuing pixels that exist outside of the contour W1 of the face. In other words, within the face detail image P4, the component image creating unit 6c deletes the parts outside of the contour W1 of the face and leaves the parts inside of the contour W1 of the face which contact the contour W1 (for example, the left eyebrow in FIG. 3A and the like). Further, the component image creating unit 6c creates the face component image P5 (see FIG. 3B) including part images M of the main face components such as eyes, nose, mouth, eye brows and such like, for example. Here, in FIG. 3A, the contour W1 of the face is schematically expressed with dashed line.

The component image creating unit 6c may extract and obtain information relating to relative positional relation in the XY plane space and information relating to coordinate positions of the part images M of the face components.

Here, although the processing using AAM is described as an example of the detail extraction processing, the processing is not limited to such example and can be arbitrarily modified. For example, as the detail extraction processing, edge extraction processing or anisotropic diffusion processing may by performed to crate the face component image P5 including the part images M of the face components. In particular, the component image creation 6c may perform differential operation using a predetermined differential filter (for example, a high pass filter or the like) with respect to the image data (YUV data) of the original image P3 and perform the edge detection processing which detects the parts with radical changes in brightness values, colors and density as edges, for example. Further, the component image creating unit 6c may perform the anisotropic diffusion processing for smoothing with respect to the image data of the original image P3 by varying the weight between the tangential direction of edges in line and the vertical direction of edges in line, by using a predetermined anisotropic diffusion file, for example.

The feature information extraction unit 6d extracts feature information from the face region F1 in the original image P3.

In other words, the feature information extraction unit 6d, as an information extraction unit, extracts feature information such as the shape of the contour W1 of the face and the like, for example, from the face in the original image P3 which is obtained by the image obtaining unit 6a. In particular, the feature information extraction unit 6d performs feature extraction processing for selecting and extracting the block regions (feature points) of highly prominent features in the face region F1 on the basis of the image data (YUV data) in the original image P3. For example, the feature information extraction unit 6d extracts the shape of the contour W1 of the face as feature information by performing the feature extraction processing with respect to pixels that constitute the contour W1 of the face specified in the face region F1 by the processing using AAM as the detail extraction processing, for example. Here, as for the shape of the contour W1 of the face, an oval shape whose major axis and minor axis are specified is suggested, in particular, an oval shape which matches the contour W1 of the jaw of each face is suggested.

As feature information to be extracted by the feature extraction processing, although the shape of the face contour is described as an example, feature information is not limited to such example and feature information can be arbitrarily modified as long as the information is information that can be compared between the original image P3 and the hairstyle image P1 (or the face contour image P2). For example, feature vectors of the face contours of the original image P3 and the hairstyle image P1 (or the face contour image P2) may be extracted and used or the shape of the hairstyle may be used. Since the feature extraction processing is a well known technique, description is omitted.

The hairstyle image specifying unit 6e specifies the hairstyle image P1 which corresponds to the feature information extracted by the feature information extraction unit 6d.

In other words, the hairstyle image specifying unit 6e, as a hairstyle specifying unit, specifies the hairstyle image P1 associated with the feature information extracted by the feature information extraction unit 6d in the hairstyle images P1 recorded in the image recording unit 5 with association to the feature information of faces. In particular, the hairstyle image specifying unit 6e compares the oval shapes which define the shapes of predetermined number of face contours which are recorded in the image recording unit 5 to the oval shape which defines the shape of the contour W1 of the face which is extracted by the feature information extraction unit 6d and specifies the matching oval shape having the matching degree higher than a predetermined value. Then, the hairstyle image specifying unit 6e specifies the image data of the hairstyle image P1 associated with the specified oval shape.

Here, the hairstyle image specifying unit 6e may specify a plurality of oval shapes having matching degrees higher than a predetermined value and specify the oval shape which a user desires in the plurality of oval shapes by a predetermined operation performed on the operation input unit 9 by a user.

The face contour image specifying unit 6f specifies the face contour image P2 which corresponds to the feature information extracted by the feature information extraction unit 6d.

In other words, the face contour image specifying unit 6f, as the second obtaining unit, specifies the face contour image P2 associated with the feature information extracted by the feature information extraction unit 6d in the face contour images P2 which are recorded in the image recording unit 5 with association to feature information of faces. In particular, the face contour image specifying unit 6f compares the oval shapes which define shapes of a predetermined number of face contours recorded in the image recording unit 5 to the oval shape which defines the shape of the contour W1 of the face extracted by the feature information extraction unit 6d and specifies the matching oval shape having the matching degree higher than a predetermined value. Then, the face contour image specifying unit 6f specifies the image data of the face contour image P2 associated with the specified oval shape.

Here, the face contour image specifying unit 6f may specify a plurality of oval shapes having matching degrees higher than a predetermined value and specify the oval shape which a user desires in the plurality of oval shapes by a predetermined operation performed on the operation input unit 9 by a user.

Moreover, the face contour image specifying unit 6f, as the second detecting unit, detects the direction of the contour of the specified face contour image P2. The direction of the contour of the face in an image means the shifted direction when the reference face which is in the condition when the face is seen from approximately the front is rotated in a predetermined direction centering the shaft that extends in at least one of the front-back direction, right-left direction and up-down direction, the directions being orthogonal to each other. The tip PS3 of the jaw is set as the center in the right-left direction of the face contour.

The jaw contour specifying unit 6g specifies the jaw contour W2 in the face detail image P4, the rectangle region F2 in which the jaw contour W2 fits and the tip of the jaw in the face detail image P4.

In other wards, the jaw contour specifying unit 6g, as a specifying unit, specifies the jaw contour W2 in the face detail image P4 which is obtained by the processing using AAM and the rectangle region F2 in which the jaw contour W2 fits (see FIG. 6). Further, the jaw contour specifying unit 6g calculates the mid point between the eyes in the face detail image P4, specifies the point where the straight line which is perpendicular to the line connecting the centers of the eyes and passes through the calculated mid point intersects the specified jaw contour W2 in the face detail image P4 as the tip of the jaw in the face detail image P4.

Since the specification processing of the jaw contour W2 and the rectangle region F2 in which the jaw contour W2 fits is a well known technique, the description is omitted.

The face contour image dividing unit 6h creates face contour divided regions by dividing the face contour image in the left and right and creates further divided regions by further dividing each of the face contour divided regions in the left and right.

In other words, the face contour image dividing unit 6h, as a dividing unit, divides the face contour image P2 which is specified by the face contour image specifying unit 6f into the left divided face contour region and the right divided face contour region by setting the tip of the jaw as the center and further creates a plurality of further divided regions by dividing each of the face contour regions in the left and right.

The face contour image converting unit 6i converts the face contour image P2 which is specified by the face contour image specifying unit 6f on the basis of the direction in which the face in the image is facing, the converting is in a manner as if the face contour image P2 is rotated centering around a predetermined direction axis.

The direction in which the face in the image is facing is the shifted direction of the face if the face is rotated in a predetermined direction centering around an axis that extends in any of the direction in the front-back direction, right-left direction and up-down direction of the standard face when the face is seen from the front, the front-back direction, right-left direction and up-down direction being perpendicular to one another.

In other words, the face contour image converting unit 6i, as a converting unit, converts the face detail image P4 by performing rotary correction so that the eyes positions be horizontal in the face detail image P4 obtained by the processing using AAM, that is, as if the face detail image P4 rotates centering around the axis which extends in the front-back direction of the face when seen from approximately the front direction.

Further, the face contour image converting unit 6i enlarges or reduces the face contour image P2 as a whole so that the rectangle region in which the jaw contour fits in the face contour image P2 which is specified by the face contour image specifying unit 6f matches the specified rectangle region F2 in which the jaw contour W2 fits in the face detail image P4, and the face contour image converting unit 6i converts the face contour image P2 so that the left and right ratio setting the tip of the jaw as the center matches that of the face detail image P4.

In other words, the face contour image converting unit 6i calculates the center point between the two eyes in the face detail image P4 and draws a straight line which is orthogonal to the straight line connecting the centers of the two eyes and which passes through the calculated center point. Then, the face contour image converting unit 6i converts the face contour image P2 so that the point PS2 which is the point where the above drawn straight line intersects the jaw contour W2 of the face detail image P4, which is specified above, and the point PS3 match.

In particular, one of the left and right divided face contour regions formed by the face contour image dividing unit 6h is enlarged and the other of the left and right divided face contour regions is reduced.

Here, in a case where the face contour image P2 is converted so that the left and right ratio setting the tip of the jaw as the center matches that of the face detail image P4, it is needless to say that the matching does not need to be complete and it is sufficient that the left and right ratio setting the tip of the jaw as the center substantially match that of the face detail image P4.

The portrait image creating unit 6j creates a portrait image P6 by using the hairstyle image P1, the face component image P5 and the face contour image P2.

That is, the portrait image creating unit 6j, as a creating unit, creates the portrait image P6 by using image data of the hairstyle image P1 specified by the hairstyle image specifying unit 6e, the part images M in the face component image P5 created by the component image creating unit 6c and image data of the face contour image P2 specified by the face contour image specifying unit 6f and converted by the face contour image converting unit 6i.

In particular, the portrait image creating unit 6j specifies the positions where to superimpose the part images M which are the face components such as eyes, nose, mouth, eyebrows and such like, for example, in the space inside the hairstyle image P1 and the contour W1 of the face in the face contour image P2, superimposes the part images M which are the face components at the specified positions and creates image data of the portrait image P6 which expresses the original image P3 in a portrait style. At this time, the portrait image creating unit 6j may convert the hairstyle image P1 and the face contour image P2 so that the oval shape which defines the contour of the face of the portrait matches the oval shape which defines the contour W1 of the face in the original image P3.

Moreover, the portrait image creating unit 6j may create an image wherein predetermined parts (for example, face components such as eyes, mouth, eye brows and such like) in the portrait image P6 are colored with predetermined colors.

The display control unit 7 controls the reading out of image data for display which is temporarily stored in the memory 4 and displaying of the image data in the display unit 8.

In particular, the display control unit 7 includes a Video Random Access Memory (VRAM), a VRAM controller, a digital video encoder and the like. The digital video encoder regularly reads out luminance signals Y and color-difference signals Cb and Cr which are read out from the memory 4 and stored in the VRAM (omitted in the drawing) under the control of the central control unit 10 from the VRAM via the VRAM controller. Then the digital video encoder generates video signals according to the read data and outputs the video signals to the display unit 8.

The display unit 8 is a liquid crystal display panel, for example, and displays an image captured by the image capturing unit 1 according to the video signals from the display control unit 7 in the display screen. In particular, in a still image capturing mode or in a video capturing mode, the display unit 8 performs live view image display sequentially updating a plurality of frame images created by capturing images of a subject by the image capturing unit 1 and the image capturing control unit 2 at a predetermined frame rate.

Moreover, the display unit 8 displays images (rec view images) recorded as still images or displays images which are being recorded as a video.

The operation input unit 9 is for performing predetermined operations of the image capturing device 100. In particular, the operation input unit 9 includes operating units such as a shutter button relating to capturing instructions with respect to a subject, a selection deciding button relating to selection instructions of image capturing modes and functions, a zoom button relating to adjustment instructions of zooming and the like (all of them are omitted in the drawing), and the operation input unit 9 outputs predetermined operation signals according to the operations of the buttons which are the operating units to the central control unit 10.

The central control unit 10 controls the parts in the image capturing device 100. In particular, the central control unit 10 includes a CPU (Central Processing Unit) (omitted in the drawing) and the like and performs various controlling operations according to various types of processing programs (omitted in the drawing) for the image capturing device 100.

Figure 4:
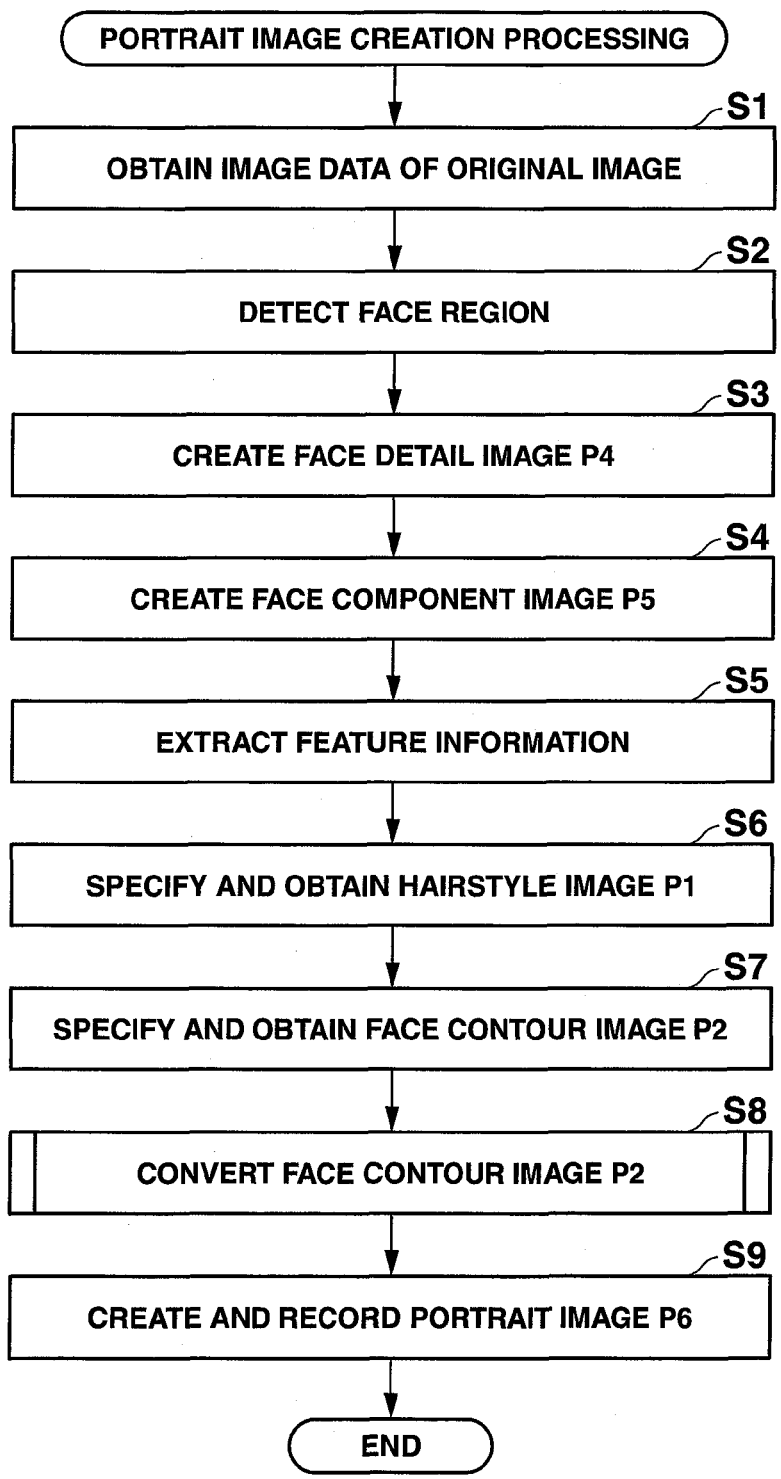
FIG. 4 is a flowchart showing an example of operations relating to the portrait image creation processing performed by the image capturing device of FIG. 1.

Next, the portrait image creation processing performed by the image capturing device 100 will be described with reference to FIG. 4. FIG. 4 is a flowchart showing an example of operations according to the portrait image creation processing.

The portrait image creation processing is to be executed by the parts in the image capturing device 100, specifically by the image processing unit 6, under the control of the central control unit 100 when it is instructed to select the portrait image creating mode among a plurality of operation modes displayed in the menu screen by a user performing a predetermined operation of the selection deciding button in the operation input unit 9.

It is assumed that the image data of the original image P3 which is subject to the portrait image creation processing is recorded in the image recording unit 5.

As shown in FIG. 4, first, the image recording unit 5 reads out the image data of the original image P3 (see FIG. 2A) which is specified by a predetermined operation performed on the operation input unit 9 by a user among the image data recorded in the image recording unit 5, and the image obtaining unit 6a of the image processing unit 6 obtains the read out image data as the target for the portrait image creation processing (step S1).

Next, the face detection unit 6b detects the face region F1 by performing a predetermined face detection processing with respect to the image data of the original image P3 which is obtained by the image obtaining unit 6a as the target for the processing (step S2).

Thereafter, the component image creating unit 6c performs the detail extraction processing (for example, processing using AAM or the like) with respect to the detected face region F1 and creates the face detail image P4 (see FIG. 2B) in which face components such as eyes, nose, mouth, eye brows, face contour and the like in the face region F1 and hair in the original image P3 are expressed with lines (step S3). Then, the component image creating unit 6c specifies the contour W1 of the face in the face region F1 by the detail extraction processing and creates the face component image P5 including the face components inside the contour W1 of the face and the face components contacting the contour W1, that is, including the part images M which are the main face components such as eyes, nose, mouth, eye brows and the like, for example (step S4; see FIG. 3B).

Thereafter, the feature information extraction unit 6d performs the feature extraction processing with respect to the pixels constituting the contour W1 of the face specified in the face region F1 by the detail extraction processing. Then, the feature information extraction unit 6d specifies the oval shape which defines the shape of the contour W1 of the face and extracts the specified oval shape as feature information (step S5).

Next, the hairstyle image specifying unit 6e compares the oval shapes which define the shapes of a predetermined number of face contours which are recorded in the image recording unit 5 to the oval shape which defines the shape of the contour W1 of the face extracted by the feature information extraction unit 6d. Then, the hairstyle image specifying unit 6e specifies the oval shape having the matching degree higher than a predetermined value and specifies the image data of the hairstyle image P1 associated with the above specified oval shape, and then, reads out and obtains the image data of the hairstyle image P1 from the image recording unit 5 (step S6).

Similarly, the face contour image specifying unit 6f compares the oval shapes which define the shapes of a predetermined number of face contours which are recorded in the image recording unit 5 to the oval shape which defines the shape of the contour W1 of the face which is extracted by the feature information extraction unit 6d. Then, the face contour image specifying unit 6f specifies the oval shape having the matching degree higher than a predetermined value and specifies the image data of the face contour image P2 associated with the specified oval shape, and then, reads out and obtains the image data from the image recording unit 5 (step S7).

Figure 5:
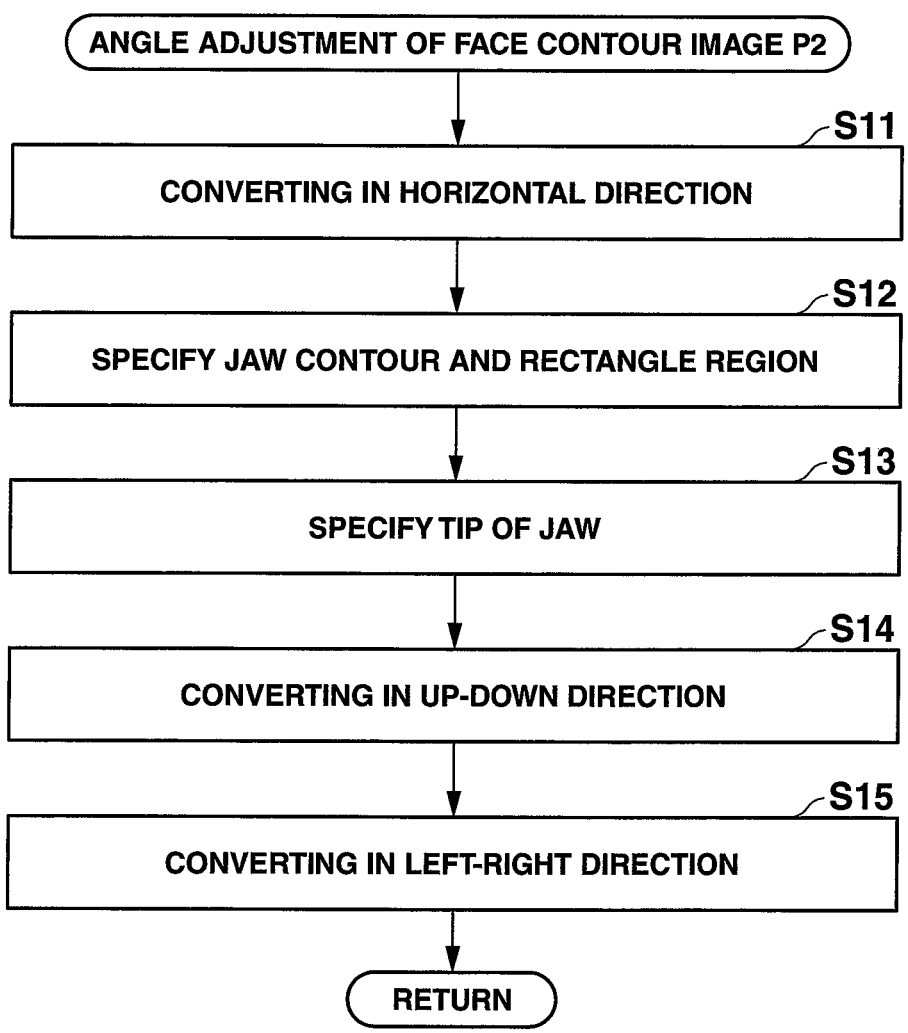
FIG. 5 is a flowchart showing an example of detailed operations relating to converting of a face contour image.

Thereafter, the face contour image converting unit 6i performs converting of the face contour image P2 (step S8). Here, the converting of the face contour image P2 by the face contour image converting unit 6i (step S8) will be described in detail with reference to FIG. 5. FIG. 5 is a flowchart showing an example of detail operations relating to the converting of the face contour image P2.

First, the face contour image converting unit 6i converts the face detail image P4 as if the face detail image P4 is rotated centering around the axis which extends in the front-back direction of the face when seen from the front (step S11).

Figure 6A:
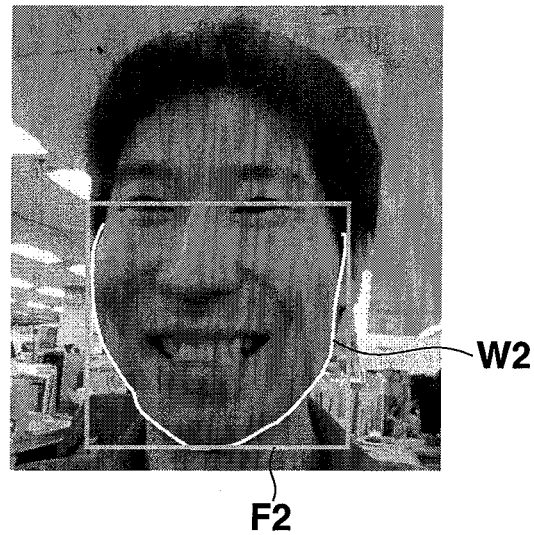
FIGS. 6A and 6B are views schematically showing examples of images relating to converting of a face contour image.

For example, as shown in FIG. 6A, the face contour image converting unit 6i converts the face detail image P4 as if the face detail image P4 is rotated centering around the axis which extends in the front-back direction of the face when seen from the front in order to make the positions of the eyes in the face detail image P4, which is obtained by the processing using AAM, be on the level.

Next, the jaw contour specifying unit 6g specifies the jaw contour W2 and the rectangle region F2 in which the jaw contour W2 fits in the face detail image P4 (step S12). In FIG. 6A, the jaw contour W2 in the face detail image P4 is superimposed on the original image P3 for simplifying the description.

Further, the jaw contour specifying unit 6g specifies the tip PS2 of the jaw in the face detail image P4 (step S13).

Figure 6B:
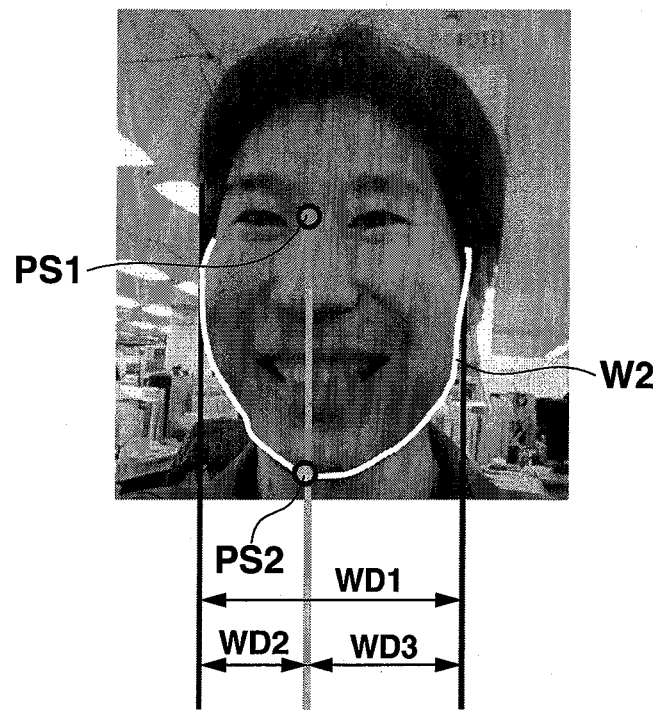

For example, as shown in FIG. 6B, the jaw contour specifying unit 6g calculates the mid point PS1 between two eyes in the face detail image P4 which is obtained by the processing using AAM and specifies the point where the straight line which is perpendicular to the line connecting the centers of the eyes and passes through the calculated mid point intersects the specified jaw contour W2 as the tip PS2 of the jaw in the face detail image P4. In FIG. 6B, the jaw contour W2 of the face detail image P4 is superimposed on the original image P3 for simplifying the description.

Next, the face contour image converting unit 6i converts the face contour image P2 as if the face contour image P2 is rotated centering around the axis which extents in the right-left direction of the face when seen from the front (step S14).

Figure 7A:
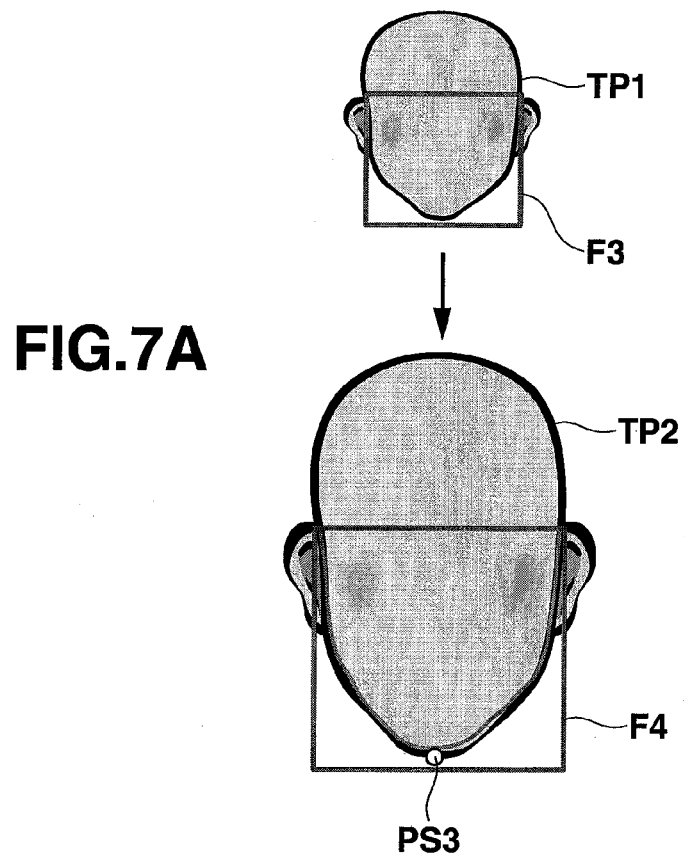
FIGS. 7A and 7B are views schematically showing examples of images relating to converting of a face contour image.

For example, as shown in FIG. 7A, the face contour image converting unit 6i enlarges or reduces the face contour image P2 as a whole so that the rectangle region F3 in which the jaw contour fits in the face contour image P2 specified by the face contour image specifying unit 6f matches the rectangle region F2, which is specified by the jaw contour specifying unit 6g, in which the jaw contour W2 fits in the face detail image P4.

In particular, if the face contour image P2 stored in the image recording unit 5 is in the size indicated by "TP1" in FIG. 7A, the face contour image P2 is enlarged as a whole to the size indicated by "TP2" in FIG. 7A so that the rectangle region F3 in which the jaw contour fits is enlarged to the rectangle region F4 to make the rectangle region F3 match the rectangle region F2, which is specified by the jaw contour specifying unit 6g, in which the jaw contour W2 fits in the face detail image P4.

In such way, by enlarging or reducing the face contour image P2 as a whole, the face contour image P2 can be converted as if the face contour image P2 is rotated centering around the axis which extends in the right-left direction of the face when seen from the front.

That is, in a case where the face is facing up or down and not facing the front, the vertical direction of the rectangle region in which the jaw contour of the face fits is short. By matching the rectangle region F3 in which the jaw contour fits in the face contour image P2 to such rectangle region, the vertical direction of the face contour image P2 becomes short and more natural portrait image can be created.

Here, in a case of converting the face contour image P2 as if the face contour image P2 is rotated centering around the axis which extends in the right-left direction of the face when seen from the front, the horizontal width of the face contour image P2 may be maintained at constant and only the vertical width may be maintained at constant enlarged or reduced in addition to simply enlarging or reducing the face contour image P2 as a whole.

Next, after the face contour image converting unit 6i converts the face contour image P2 as if the face contour image P2 is rotated centering around the axis which extends in the up-down direction of the face when seen from the front (step S15), the processing returns to step S9 in the flowchart of FIG. 4 (return).

For example, the face contour image converting unit 6i enlarges one of the left and right divided face contour regions which are formed by the face contour image P2 being divided in the left and right by the face contour image dividing unit 6h and reduces the other of the left and right divided face contour region so that the tip SP2 (see FIG. 6B) of the jaw specified in the face detail image P4 match the tip PS3 (see FIG. 7A) of the jaw in the face contour image P2.

In particular, because the face contour image P2 is a front image, the tip PS3 of the jaw in the face contour image P2 is at the center in the lower hem of the rectangle region F4. On the other hand, in FIG. 6B, the tip PS2 of the jaw in the face detail image P4 is slightly shifted to the left direction in the drawing from the center of the jaw width WD1.

Figure 7B:
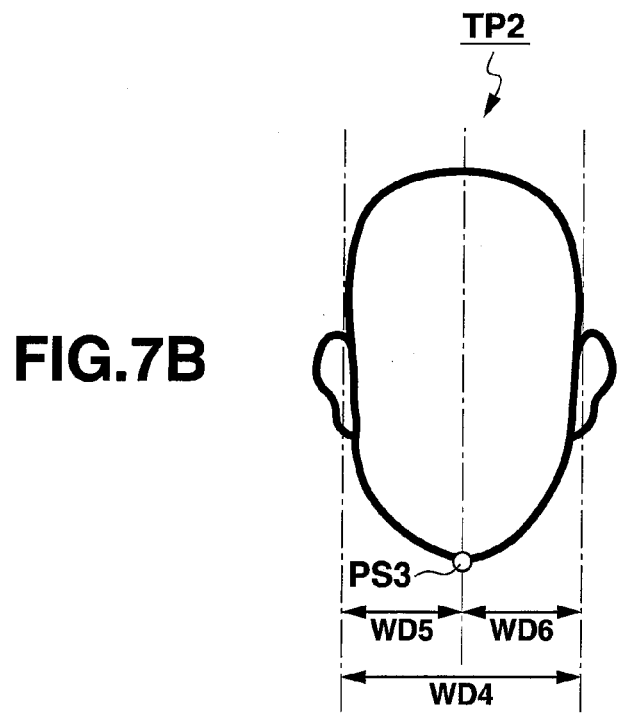

Therefore, the face contour image converting unit 6i maintains the jaw width WD4 (the same length as the jaw width WD1) in the face contour image P2 (see FIG. 7B) at constant and enlarges one of the left and right divided face contour regions which are formed by the face contour image P2 being divided in the left and right and reduces the other of the left and right divided face contour regions so that the length WD5 which is the left side jaw width from the TIP PS3 of the jaw in the drawing and the width D6 which is the right side jaw width from the tip PS3 of the jaw in the drawing are respectively equal to the width WD2 which is the left side jaw width from the tip PS2 of the jaw in FIG. 6B and the width WD3 which is the right side jaw width from the tip PS2 of the jaw in FIG. 6B.

That is, in FIG. 6B, because the width WD2 which is the left side jaw width from the tip PS2 of the jaw in the drawing is shorter than the width WD3 which is the right side jaw width from the tip PS2 of the jaw in the drawing, the face contour image converting unit 6i maintains the jaw width WD4 in the face contour image P2 (see FIG. 7B) at constant and adjusts the scaling ratio of the divided face contour regions formed by dividing the face contour image P2 in the left and right by reducing the width WD5 so as to be narrower and by enlarging the width WD6 so as to be wider.

In such way, by enlarging one of the left and right divided face contour regions and reducing the other of the left and right divided face contour regions, the divided face contour regions being formed by dividing the face contour image P2 in the left and right by the face contour image dividing unit 6h, the face contour image P2 can be converted as if the face contour image P2 is rotated centering around the axis which extends in the up-down direction of the face when seen from the front.

Finally, returning to the flowchart of FIG. 4, the portrait image creating unit 6j specifies the hairstyle image P1, the face contour image P2 and the positions to superimpose the part images M which are face components such as eyes, nose, mouth, eye brows and such like, for example, in the face component image P5, superimposes the part images M which are the face components at the specified positions and creates the image data of the portrait image P6 which expresses the original image P3 in the portrait style.

Then, the image recording unit 5 obtains and records the image data (YUV data) of the portrait image P6 which is created by the portrait image creating unit 6j (step S9; see FIG. 10).

Herewith, the portrait image creation processing ends.

Figure 8A:
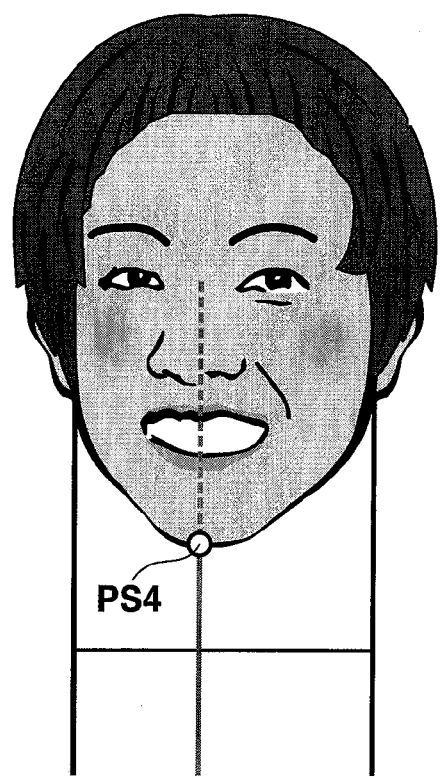

For example, in the portrait image P6 shown in FIG. 8A created by the portrait image creating unit 6j, the tip PS4 of the jaw in the face contour image P2 matches the tip PS2 (see FIG. 6B) of the jaw specified in the face detail image P4. Therefore, the portrait image P6 is more natural.

Figure 8B:
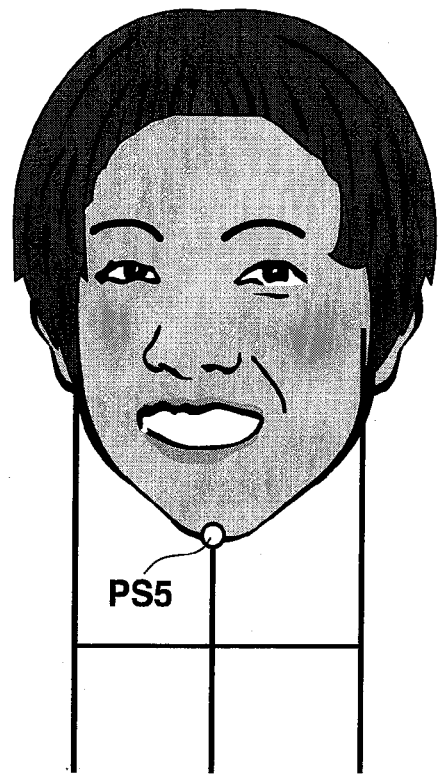

On the other hand, FIG. 8B shows a portrait image of the case where converting of the face contour image P2 by the face contour image converting unit 6i was not performed, and here, the tip PS5 of the jaw in the face contour image P2 which is the center part of the jaw width does not match the tip PS2 of the jaw (see FIG. 6B) specified in the face detail image P4. Therefore, the balance of the face contour and the arranged part images which are the face components such as eyes, nose, mouth, eye brows and such like is unnatural.

As described above, according to the image capturing device 100 of the embodiment, the face component image and the face contour image can be converted by taking the directions in which those images, the images being the basis for creating the portrait image, are facing into consideration. Therefore, more natural portrait can be created.

Moreover, by enlarging one of the left and right divided face contour regions and reducing the other of the left and right divided face contour regions, the left and right divided contour regions formed by dividing the face contour image P2 in the left and right, so that the tip PS2 of the jaw specified in the face detail image P4 and the tip PS3 of the jaw in the face contour image P2 match, the face contour image P2 can be converted as if the face contour image P2 is rotated centering around the axis which extend in the up-down direction of the face when seen from the front.

Further, the portrait image P6 which is to be created can be converted as if the portrait image P6 is rotated centering around the axis which extends in the front-back direction of the face when seen from the front by performing the rotational correction so that the positions of the two eyes be on the level when specifying the rectangle region F2 in which the jaw contour W2 fits in the face detail image P4 obtained by the processing using AAM.

Furthermore, by enlarging or reducing the face contour image P2 as a whole or by maintaining the horizontal width of the face contour image P2 at constant and enlarging or reducing only the vertical width of the face contour image P2 so that the rectangle region in which the jaw contour fits in the face detail image P4 and the rectangle region in which the jaw contour fits in the face contour image P2 match, the face contour image P2 can be converted as if the face contour image P2 is rotated centering around the axis which extend in the right-left direction of the face when seen from the front.

(Modification Embodiment 1)

The modification example 1 of the first embodiment will be described. Here, the descriptions similar to those in the first embodiment are omitted.

In the first embodiment, by enlarging the divided face contour region indicated by the width WD6 so as to be wider, not only the face contour but also the width of an ear which constitutes the face contour image P2 is enlarged.

On contrary, by reducing the divided face contour region indicated by the width WD5 so as to be narrower, not only the face contour but also the width of an ear which constitutes the face contour image P2 is reduced. However, in the case where the width of an ear is reduced, only a slight strangeness is provoked comparing to the case where the width of an ear is enlarged.

Therefore, in the case where the rate for enlarging the width of an ear is large, the portrait to be created is to be an unnatural portrait.

Figure 9A:
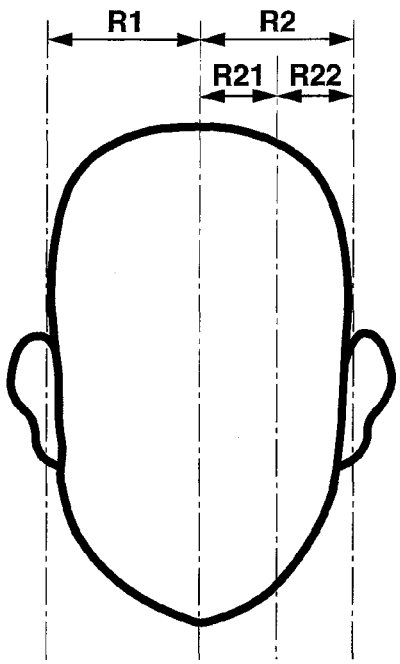
FIGS. 9A and 9B are views schematically showing examples of face contour images relating to modified embodiments 1 and 2.

Therefore, as shown in FIG. 9A, the face contour image dividing unit 6h which is a dividing unit further divides the divided face contour region R2, which is one of the divided face contour regions R1 and R2 formed by diving the face contour image P2 in the left and right, into further divided regions R21 and R22 in the modification example 1, the divided face contour region R2 being the region to be enlarged. Here, the original image P3 and other conditions are the same as those in the first embodiment.

Then, when enlarging the further divided regions R21 and R22 so as to be wider, the face contour image converting unit 6i which is a converting unit makes the enlarging rate of the further divided region R22 smaller than the enlarging rate of the further divided region R21.

That is, by making the enlarging rate of the further dividing region R22 including an ear smaller comparing to the other further divided region R21, the portrait to be created can be prevented from appearing unnatural due to the width of an ear being enlarged.

As described above, in the deformation embodiment 1, by the face contour image converting unit 6i which is a converting unit changing the enlarging rate or the reducing rate between the further divided regions which are formed by further dividing a divided face contour region, in particular, by making the enlarging rate of the further divided region including an ear smaller comparing to the other further divided region, the portrait with more natural appearance can be created.

(Modification Embodiment 2)

The modification embodiment 2 of the first embodiment will be described. Here, the descriptions similar to those in the first embodiment are omitted.

In the modification embodiment 2, the enlarging rate or the reducing rate of the divided face contour regions can be changed continuously without further dividing the divided face contour regions into further divided regions.

Figure 9B:
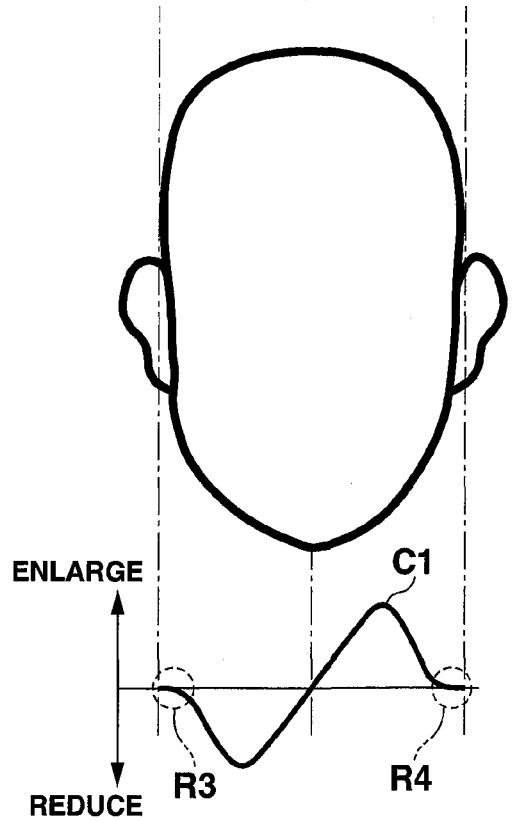

For example, as shown in the curved line C1 indicating the enlarging ratio and the reducing ratio in FIG. 9B, the width of the left side divided face contour region in the drawing is continuously reduced and the width of the right side divided face contour region in the drawing is continuously enlarged, and also, the ear part regions R3 and R4 are not enlarged nor reduced.

In such way, by continuously changing the enlarging rate and the reducing rate of the widths in the divided face contour regions, the face contour image P2 can be converted as if the face contour image P2 is rotated centering around the axis which extends in the up-down direction of the face when seen from the front without changing the widths of the ears at all.

As described above, in the modification embodiment 2, by the face contour image converting unit 6i which is a converting unit continuously changing the enlarging rate and the reducing rate of the widths of the divided face contour regions, the portrait with more natural appearance can be created.

(Modification Embodiment 3)

The modification embodiment 3 of the first embodiment will be described. Here, the descriptions similar to those in the first embodiment are omitted.

In the modification embodiment 3, the hairstyle image P1 can also be converted according to the direction in which the face in the original image P3 is facing.

For example, by the face contour image converting unit 6i which is a converting unit converting the hairstyle image P1 following the procedure as shown in the above described step S8 (see FIG. 5 for detail) in FIG. 4 after synthesizing the hairstyle image P1 and the face contour image P2 or independently from the face contour image P2, the portrait wherein the hairstyle image P1 and the face contour image P2 are converted according to the direction in which the face in the original image P3 is facing can be created.

That is, by enlarging the horizontal width of one of the divided hairstyle regions formed by dividing the hairstyle image P1 in the left and right and reducing the horizontal width of the other of the divided hairstyle regions, the face contour image P2 can be converted, including the hairstyle, as if the face contour image P2 is rotate centering around the axis which extends in the up-down direction of the face when seen from the front.

As described above, in the modification embodiment 3, by the face contour image converting unit 6i which is a converting unit enlarging the horizontal width of one of the divided hairstyle regions formed by dividing the hairstyle image P1 in the left and right and reducing the horizontal width of the other of the divided hairstyle regions, the portrait with more natural appearance can be created.

(Modification Embodiment 4)

The modification embodiment 4 of the first embodiment 1 will be described. Here, the descriptions similar to those in the first embodiment are omitted.

In the modification embodiment 4, the face contour image P2 pre-including the face components such as eyes, nose, mouth, eye brows and such like may be converted according to the direction in which the face in the original image P3 is facing.

As described above, in the modification embodiment 4, by the face contour image converting unit 6i which is a converting unit converting the face contour image P2 pre-including the face components such as eyes, nose, mouth, eye brows and such like according to the direction in which the face in the original image P3 is facing, the portrait with more natural appearance can be created without creating the face component image P5.

The present invention is not limited to the above embodiments and various refinements and design changes can be made within the scope of the invention.

For example, in the above embodiments, feature information (shape of the contour W2 of a face or the like) is extracted after the face component image P5 is created. However, such order in processing is merely an example and the present invention is not limited to such example. The order may be reversed, that is, the face component image P5 may be created after the extraction processing of feature information.

Moreover, in the embodiments, the face component image P5 is created from the face region F1 which is detected by the face detection unit 6b. However, whether to include the face detection unit 6b which performs the face detection processing may be changed arbitrarily.

Further, the image which is to be the basis for creating the face component image P5 does not need to be the original image P3 of a face facing the front. For example, in a case where the image of a face tilted to face a diagonal direction is used, an image wherein such tilted face is converted so as to face the front can be created and used as the basis.

Moreover, in the embodiments, there is provided the image recording unit 5 which records the hairstyle images p1 and the face contour images P2. However, the present invention is not limited to this and, for example, the configuration may be such that the hairstyle images P1 and the face contour images P2 are recorded in a predetermined server which can be connected with the device of the present invention through a predetermined communication network, and this predetermined server can be accessed from a communication processing unit (omitted in the drawing) through the communication network and the image obtaining unit 6a can obtain a hairstyle image P1 and a face contour image P2 from the server.

Moreover, in the above embodiments, the portrait image P6 is created by superimposing the part images M which are the face components such as eyes, nose, mouth, eye brows and such like on the hairstyle image P1 and the face contour image P2. However, this is merely an example and the present invention is not limited to this example.

Further, the above described configuration of the image capturing device 100 is an example and the configuration of the image capturing device 100 is not limited to such example. Furthermore, although the image capturing device 100 is exemplified as an image creating device, the image creating device is not limited to this. Any configuration can be applied to the image creating device as long as the image creation processing according to the present invention can be executed.

Moreover, in the embodiments, the face contour image specifying unit 6f which is the second obtaining unit specifies the hairstyle image P1 associated with the feature information extracted by the feature information extraction unit 6d. However, the face contour image specifying unit 6f may specify the hairstyle image P1 without using the feature information extracted by the feature information extraction unit 6d.

In the first embodiment, the hairstyle image P1 and the face contour image P2 are dealt with and described independently for simplifying the descriptions. However, an image where the hairstyle image P1 and the face contour image P2 are integrated may be used as the face contour image P2.

That is, the face contour image P2 associated with the shape of the face which also shows the hair contour may be used.

It is needless to say that the face contour image P2 may be only the face contour and not including the hairstyle contour.

In such case, the portrait image creating unit 6j which is the creating unit can create the portrait image P6 by using the part images M in the face component image P5 and the image data of the face contour image P2 which is specified by the face contour image specifying unit 6f and converted by the face contour image converting unit 6i without using the image data of the hairstyle image P1 which is specified by the hairstyle image specifying unit 6e.

Similarly, in a case where the image wherein the hairstyle image P1 and the face contour image P2 are integrated is used as the face contour image P2, the face contour image P2 also shows the hair contour. Here, by the face contour image converting unit 6i which is the converting unit enlarging one of the divided face contour regions formed by dividing the face contour image P2 in the left and right and reducing the other of the divided face contour regions so that the tip PS2 of the jaw specified by the face detail image P4 and the tip PS3 of the jaw in the face contour image P2 match, the hairstyle can be converted as if the hairstyle is rotated centering around the axis which extends in the up-down direction of the face when seen from the front.

Moreover, by the face contour image converting unit 6i which is the converting unit performing the rotational correction so that the positions of the eyes be on the level when the rectangle region F2 in which the jaw contour W2 fits is to be specified in the face detail image P4 obtained by the processing using AAM, the hairstyle can be converted as if the hairstyle is rotated centering around the axis which extends in the front-back direction of the face when seen from the front.

Further, by the face contour image converting unit 6i which is the converting unit enlarging or reducing the face contour image P2 as a whole or enlarging of reducing only the vertical width of the face contour image P2 while maintaining the horizontal width of the face contour image P2 at constant so that the rectangle region in which the jaw contour fits in the face detail image P4 and the rectangle region in which the jaw contour fits in the face contour image P2 match, the hairstyle can be converted as if the hairstyle is rotated centering around the axis which extends in the right-left direction of the face when seen from the front.

Moreover, in the embodiments, the jaw contour specifying unit 6g which is the specifying unit calculates the mid point between the eyes in the face detail image p4 which is obtained by the processing using AAM and specifies the point where the straight line which is perpendicular to the line connecting the centers of the eyes and passes through the calculated mid point intersects the specified jaw contour as the tip of the jaw in the face detail image P4. However, it is needless to say that the tip of the jaw in the face component image P5 can be specified by performing the above processing with respect to the face component image P5.

Further, in the embodiments, the face contour image converting unit 6i which is the converting unit enlarges or reduces the face contour image P2 as a whole so that the rectangle region in which the jaw contour fits in the face contour image P2 and the rectangle region in which the jaw contour fits in the face detail image P4 match. However, it is needless to say that the face contour image converting unit 6i which is the converting unit may enlarge or reduce the face contour image P2 as a whole so that the rectangle region in which the jaw contour fits in the face contour image P2 and the rectangle region in which the jaw contour fits in the face component image P5 match.

Furthermore, in the embodiments, the face contour image converting unit 6i which is the converting unit converts the face contour image P2 so that the left and right ratio setting the tip of the jaw as the center match that of the face detail image P4. However, it is needless to say that the face contour image converting unit 6i which is the converting unit may convert the face contour image P2 so that the left and right ratio setting the tip of the jaw as the center matches that of the face detail component image P5.

Moreover, in the embodiments, the face contour image specifying unit 6f specifies the face contour image P2 by comparing the oval shapes which define the shapes of a predetermined number of face contours recorded in the image recording unit 5 to the oval shape which defines the shape of the contour W1 of the face extracted by the feature information extraction unit 6d. However, the face contour image specifying unit 6f may extract the feature information and the face contour image P2 from the face region F1 in the original image P3.

Further, in the embodiments, the face contour image converting unit 6i which is the converting unit converts the face contour image P2. However, it is needless to say that the face contour image converting unit 6i which is the converting unit may convert the face component image P5. For example, the face contour image converting unit 6i which is the converting unit may convert the sizes of the left and right eyes in the face component image P5.

In addition, in the above embodiments, the functions as the first obtaining unit, the extraction unit, the second obtaining unit, the converting unit and the creating unit are respectively realized by the image obtaining unit 6a, the component image creating unit 6c, the face contour image specifying unit 6f, the face contour image converting unit 6i and the portrait image creating unit 6j by being driven under the control of the central control unit 10. However, the present invention is not limited to this, and the configuration may be such that the above functions are realized by the central control unit 10 executing predetermined programs and the like.

That is, programs including the first obtaining process routine, the extraction process routine, the second obtaining process routine, the converting process routine and the creating process routine are stored in the program memory (omitted in the drawing) which stores programs in advance. Then, the first obtaining process routine may make the CPU of the central control unit 10 function as the unit to obtain an image. Further, the extraction process routine may make the CPU of the central control unit 10 function as the unit to create the face component image P5 according to the main components of the face in the obtained image. Furthermore, the second obtaining process routine may make the CPU of the central control unit 10 function as the unit to specify the face contour image P2 associated with the extracted feature information from the face contour images P2 expressing the face contours recorded in the image recording unit 5 with association to feature information of faces. Moreover, the converting process routine may make the CPU of the central control unit 10 function as the unit to convert the face contour image P2 by enlarging or reducing the face contour image P2, as a whole, which is specified by the face contour specifying unit 6f or by enlarging one of the left and right divided face contour regions formed by dividing the face contour image P2 in the left and right and reducing the other of the left and right divided face contour regions. Still further, the image creating process routine may make the CPU of the central control unit 10 function as the unit to create the portrait image P6 by using the specified hairstyle image P6, the converted face contour image P2 and the created face component image P5.

Similarly, in the above embodiments, the functions as the specifying unit and the dividing unit are respectively realized by the jaw contour specifying unit 6g and the face contour image dividing unit 6h by being driven under the control of the central control unit 10. However, the present invention is not limited to this configuration and the configuration may be such that the above functions are realized by the central control unit 10 executing predetermined programs and the like.

That is, programs including the specifying process routine and the dividing process routine are stored in the program memory (omitted in the drawing) which stores programs in advance. Then, the specifying process routine may make the CPU of the central control unit 10 function as the unit to specify the jaw contour W2 and the rectangle region F2 in which the jaw contour W2 fits in the face detail image P4. Further, the dividing process routine may make the CPU of the central control unit 10 function as the unit to create a plurality of further divided regions by dividing the face contour image P2 into the left and right divided face contour regions setting the tip of the jaw as the center and further dividing each of the left and right divided face contour regions in the left and right.

Moreover, as for the computer readable medium in which programs for executing the above processes are stored, in addition to a ROM, hard dist or the like, a non-volatile memory such as flash memory, portable recording medium such as CD-ROM (Compact Disc Read Only Memory), read only DVD (Digital Versatile Disc) and writable type DVD may be applied. Moreover, as for a medium which provides data of programs through a predetermined communication circuit, a carrier wave is applied.

In the above, various embodiments of the present invention are described. However, the scope of the present invention is not limited to the above described embodiments and the present invention includes the scope of the claims and the equivalents thereof.

The entire disclosure of Japanese Patent Application No. 2012-140288 filed on Jun. 22, 2012 including description, claims, drawings, and abstract are incorporated herein by reference in its entirety.

What is claimed is:

1. An image creating device, comprising
a first obtaining unit which obtains an image including a face;
a first extraction unit which extracts a face component image relating to main components of the face in the image obtained by the first obtaining unit and a direction of the face;
a second obtaining unit which obtains a face contour image associated to the face in the image obtained by the first obtaining unit;
a second extraction unit which extracts a direction of a face contour in the face contour image obtained by the second obtaining unit;
a converting unit which converts at least one of the face component image and the face contour image based on both the direction of the face and the direction of the face contour; and
a creating unit which creates a portrait image by using at least one of the face component image and the face contour image being converted by the converting unit;
wherein the converting unit converts the face contour image as if the face contour image is rotated centering around an axis, the axis extending in a predetermined direction according to both the direction of the face and the direction of face contour.

2. The image creating device as claimed in claim 1, wherein the axis extends in one of a front-back direction, a right-left direction and an up-down direction which are perpendicular to one another, in a state when the face is seen from a front.

3. The image creating device as claimed in claim 2 further comprising:
a specifying unit which specifies a jaw contour,
wherein the specifying unit specifies the jaw contour in the face component image, calculates a mid point between eyes in the face component image and specifies an intersection point where a straight line which is perpendicular to a straight line connecting centers of the eyes and passes through the mid point intersects the jaw contour as a tip of the jaw in the face component image.

4. The image creating device as claimed in claim 3, wherein:
the dividing unit creates a plurality of further divided regions by dividing each of the divided face contour regions into left and right, and
the converting unit changes enlarging rates or reducing rates of horizontal widths of the plurality of further divided regions.

5. The image creating device as claimed in claim 2 further comprising:
a dividing unit which divides the face contour image into left and right divided face contour regions setting the tip of the jaw as a center,
wherein the converting unit enlarges a horizontal width of one of the divided face contour regions and reduces a horizontal width of the other of the divided face contour regions.

6. The image creating device as claimed in claim 5, wherein the converting unit makes an enlarging rate or a reducing rate of a further divided region including an ear among the plurality of further divided regions smaller than the rates of the other further divided regions.

7. The image creating device as claimed in claim 2, wherein the axis extends in the up-down direction by setting a right and left ratio of the face component image as a reference, a tip of a jaw being set as a center for the right and left ratio of the face component image.

8. An image creating method, comprising:
first obtaining an image including a face;
first extracting a face component image and a direction of the face relating to main components of a face in the image obtained in the first obtaining;
second obtaining a face contour image associated to feature information of the face in the image obtained in the first obtaining;
second extracting a direction of a face contour in the face contour image obtaining in the second obtaining;
converting at least one of the face component image or the face contour image based on the the direction of the face and the direction of the face contour; and
creating a portrait image by using the face component image and the face contour image, wherein at least one of the face component image and the face contour image has been converted;
wherein the face contour image is converted as if the face contour image is rotated centering around an axis, the axis extending in a predetermined direction according to both the direction of the face and the direction of the face contour.

9. A non-transitory computer readable recording medium in which programs readable by a computer of an image creating device are recorded, the programs make the computer function as:
- a first obtaining unit which obtains an image including a face;
- a first extraction unit which extracts a face component image relating to main components of the face in the image obtained by the first obtaining unit and a direction of the face;
- a second obtaining unit which obtains a face contour image associated to the face in the image obtained by the first obtaining unit;
- a second extraction unit which extracts a direction of a face contour in the face contour image obtained by the second obtaining unit;
- a converting unit which converts at least one of the face component image and the face contour image based on both directions the direction of the face and the direction of the face contour; and
- a creating unit which creates a portrait image by using at least one of the face component image and the face contour image being converted by the converting unit;
- wherein the converting unit converts the face contour image as if the face contour image is rotated centering around an axis, the axis extending in a predetermined direction according to both the direction of the face and the direction of face contour.

* * * * *